(12) United States Patent
Lewander Xu et al.

(10) Patent No.: US 11,340,161 B2
(45) Date of Patent: May 24, 2022

(54) COMPACT MULTI-WAVELENGTH TDLAS SYSTEM

(71) Applicant: GasPorOx AB, Lund (SE)

(72) Inventors: Märta Lewander Xu, Lund (SE); Patrik Lundin, Harlösa (SE); Johannes Swartling, Lund (SE)

(73) Assignee: GasPorOx AB, Lund (JP)

( * ) Notice: Subject to any disclaimer, the term of this patent is extended or adjusted under 35 U.S.C. 154(b) by 0 days.

(21) Appl. No.: 16/609,145

(22) PCT Filed: Apr. 30, 2018

(86) PCT No.: PCT/EP2018/061019
§ 371 (c)(1),
(2) Date: Oct. 28, 2019

(87) PCT Pub. No.: WO2018/197723
PCT Pub. Date: Nov. 1, 2018

(65) Prior Publication Data
US 2020/0191713 A1    Jun. 18, 2020

(30) Foreign Application Priority Data
Apr. 28, 2017 (SE) .................... 1750515-7

(51) Int. Cl.
*G01N 21/00* (2006.01)
*G01N 21/39* (2006.01)

(52) U.S. Cl.
CPC ....... *G01N 21/39* (2013.01); *G01N 2021/399* (2013.01); *G01N 2201/0846* (2013.01)

(58) Field of Classification Search
CPC .. H01L 31/105; G01N 21/39; G01N 21/3151; G01N 2201/0846; G01N 2201/0612; G01N 2021/399; G01N 2021/8578; G01N 2021/1704; G01N 21/3504; G01N 33/004; G01J 3/42; G01J 3/427
(Continued)

(56) References Cited

U.S. PATENT DOCUMENTS 5,373,160 A * 12/1994 Taylor .................... G01N 21/39
                                                   250/338.5
5,473,161 A * 12/1995 Nix ..................... G01N 21/3504
                                                   250/339.13
(Continued)

FOREIGN PATENT DOCUMENTS

EP    2669660 A1    12/2013
GB    2492841 A     1/2013
(Continued)

OTHER PUBLICATIONS

"Optics and Lasers in Engineering", Sensor for headspace pressure and H20 concentration measurements in closed vials by tunable diode laser absorption spectroscopy; Tingdong Cai et al. Optics and Lasers in Engineering 58; 2014, pp. 48-53.*
(Continued)

*Primary Examiner* — Hoa Q Pham
(74) *Attorney, Agent, or Firm* — Knobbe Martens Olson and Bear, LLP

(57) ABSTRACT

An apparatus or method for measurement of multiple gas concentrations. The apparatus comprises a multi-wavelength laser module, and a multi-layered/multi-band detector.

20 Claims, 2 Drawing Sheets

(58) Field of Classification Search
USPC ...... 356/432–440, 419, 326, 73; 250/339.07, 250/339.01, 573, 339.02, 339.13; 257/31.061, 184, 440
See application file for complete search history.

(56) References Cited

U.S. PATENT DOCUMENTS

| | | | | |
|---|---|---|---|---|
| 5,545,897 | A * | 8/1996 | Jack | G01N 33/0011 250/339.13 |
| 5,614,718 | A * | 3/1997 | Brace | G01N 21/3504 250/339.07 |
| 5,621,238 | A * | 4/1997 | Dodd | H01L 31/105 250/548 |
| 7,528,957 | B2 * | 5/2009 | Lewis | G01J 3/02 356/419 |
| 9,068,885 | B2 * | 6/2015 | Kluczynski | G01N 33/4972 |
| 2007/0255508 | A1 * | 11/2007 | Willing | G01N 21/39 702/32 |
| 2013/0044322 | A1 * | 2/2013 | Feitisch | H01L 24/29 356/432 |
| 2014/0375995 | A1 * | 12/2014 | Kluczynski | G01J 3/42 356/408 |
| 2015/0185139 | A1 * | 7/2015 | Kiesel | G01N 21/78 356/402 |
| 2016/0231581 | A1 * | 8/2016 | Liu | G02B 27/283 |

FOREIGN PATENT DOCUMENTS

| | | | |
|---|---|---|---|
| JP | 2013-127414 A | 6/2013 | |
| WO | WO 2018/141752 A1 * | 8/2018 | |

OTHER PUBLICATIONS

Abedin et al., "Multicolor focal plane array detector technology: a review", Proceedings of SPIE, vol. 5152, Nov. 10, 2003, p. 279.

Hamamatsu, "Characteristics and use of infrared detectors", Technical Information SD-12, Nov. 2004, pp. 1-43.

Larsson et al., "Development of a compact multipass oxygen sensor used for gas diffusion studies in opaque media", Applied Optics, vol. 54 No. 33, Nov. 16, 2015, p. 9772.

Search Report and Written Opinion in International Application No. PCT/EP2018/061019, dated Aug. 31, 2018, in 13 pages.

* cited by examiner

COMPACT MULTI-WAVELENGTH TDLAS SYSTEM

CROSS-REFERENCE TO RELATED APPLICATIONS

This application is the U.S. National Phase under 35 U.S.C. § 371 of International Application No. PCT/EP2018/061019, filed Apr. 30, 2018 entitled "Compact multi-wavelength TDLAS system", which claims priority to Swedish Patent Application No. 1750515-7, filed on Apr. 28, 2017, entitled "Compact multi-wavelength TDLAS system."

BACKGROUND OF THE INVENTION

Field of the Invention

This disclosure pertains to detection of multiple gases, such as measuring multiple gas concentrations. Especially the disclosure relates to compact optical sensors for detecting multiple gases or measuring multiple gas concentrations using multiple lasers sources with overlapped laser beams.

Description of the Prior Art

In many technical areas it is of great importance to be able to precisely measure gas compositions/concentrations. The applications of gas concentration measurements span a broad range, for example various industries, such as food and pharma, and environmental monitoring, where detailed information of the gas composition can be used for process control, safety issues and health monitoring.

One method often used in these measurements is gas absorption spectroscopy. Such a method can be employed both non-invasively when the gas is situated in a sealed container, such as a food tray, but also for studying the amount of different trace gases in the environment. One particularly powerful approach is to use a tunable diode laser and a technique commonly known as tunable diode laser absorption spectroscopy (TDLAS). In this technique laser light is emitted through the gas where the resulting gas absorption is registered by a detector, giving information on whether a certain gas is present and at what amount.

A challenge with the TDLAS technique is the fact that it is generally not possible to measure multiple gases at the same time, because the laser can only tune over a small wavelength range, within which only a single gas exhibits absorption lines. The ability to measure multiple gases is crucial in, e.g., dynamic studies where it is desirable to measure concentration of many gases in the same volume, or other fast processes such as in line measurements. Today, if one wants to measure multiple gases, multiple laser sources must be used, often in combination with many detectors. The detector is sensitive to much broader wavelengths than the laser source but if the gas absorptions are far apart in wavelength, it is not possible to use only one detector.

One of the drawbacks with today's method of multiple gas measurements is the size of the system. To use multiple lasers sources and detectors, while still probing the same gas volume, the beams need to be overlapped with optics based on for example semi-transparent mirrors and dichroic beamsplitters, or optical fibers, resulting in a more complex and bulky system, like the system described in JP2013-127414. The optics needed to combine the light from the different laser sources may also decrease the measurement accuracy. Avoiding as much optics as possible is often a key to enable sensitive measurements in practical applications. In an increasing amount of applications there is a need for more compact sensors where the normal multi-laser setup is too large.

SUMMARY OF THE DISCLOSURE

Accordingly, embodiments of the present disclosure preferably seek to mitigate, alleviate or eliminate one or more deficiencies, disadvantages or issues in the art, such as the above-identified, singly or in any combination by providing an apparatus or method according to the appended patent claims for non-destructively determining the integrity of sealed containers, and/or measuring the gas composition of the headspace of containers, and/or measuring other characteristics of the container or its content that may be determined based on measured properties of gases.

In some aspects of the disclosure, an apparatus for detecting multiple gases, such as measuring multiple gas concentrations, is described. The apparatus comprises a multi-wavelength laser module, and a multi-layered/multi-band detector. The detector may be configured for detection of multiple wavelength ranges, and comprises at least two material layers arranged after each other along the same optical axis, where each layer is designed to detect a certain wavelength range.

In some examples of the apparatus, the multi-wavelength laser module, and the multi-layered/multi-band detector may be configured for measuring multiple gases simultaneously.

In some examples, the apparatus comprises a control unit for analysing light detected by the detector to retrieve concentrations of the multiple gases. The control unit may be a computer, a microprocessor or an electronic circuit that could run code or a software configured for analysing the light detected by the detector.

In some examples of the apparatus, the multi-wavelength laser module emits different laser wavelengths from laser sources arranged in the same laser housing, such as a laser can. The laser sources are positioned very close together enabling overlapped beam paths.

In some examples of the apparatus, the multi-wavelength laser module comprises tunable diode lasers.

In some examples of the apparatus, the multiple laser sources are made of different laser chips arranged in the same laser housing, such as the same laser can.

In some examples of the apparatus, the measurement of multiple gas concentrations is based on tunable diode laser absorption spectroscopy.

In some examples of the apparatus, the multi-wavelength laser module, and the multi-layered/multi-band detector are configured for measuring multiple gases simultaneously.

In some examples of the apparatus, the multi-wavelength laser module uses collimating optics for enabling overlapping beam paths.

In some examples of the apparatus, a porous medium is used as a multi-pass cell.

In some examples of the apparatus, the multi-wavelength laser module, and the multi-layered/multi-band detector are configured for gas measurements in containers for food or pharmaceuticals.

In some examples of the apparatus, the light from the multi-wavelength laser module is directed to a target site by a fiber probe.

In a further aspect of the disclosure, a method is described for employing an apparatus as herein described for allowing a concentration of a first gas being retrieved by normalization to a second gas.

In yet another aspect of the disclosure, a method of detecting multiple gases is described. The method comprising transmitting light with at least two wavelengths from a multi-wavelength laser module to a target site. The method further includes detecting light from the target site using a multi-layered/multi-band detector, such as a detector for detection of multiple wavelength ranges, wherein the detector comprises at least two material layers arranged after each other along the same optical axis. Each layer is designed to detect a certain wavelength range.

In one example of the method, may the at least two wavelengths be transmitted simultaneously.

In one example of the method, may the at least two wavelengths be transmitted with overlapping beam paths.

In one example of the method may the target site be a container comprising at least one gas. The detected light may either transmitted through the container, or may be reflected from either a surface inside the container or outside the container so that the transmitted light passes through the container at least twice.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the disclosure are capable of will be apparent and elucidated from the following description of examples of the present disclosure, reference being made to the accompanying drawings, in which.

DESCRIPTION OF EXAMPLES

Figure 1:
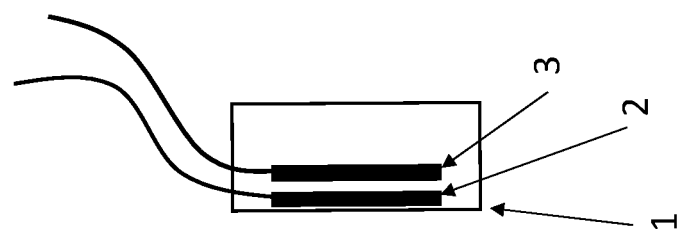
FIG. 1 is illustrating exemplary arrangements of an optical sensor.
Figure 1:
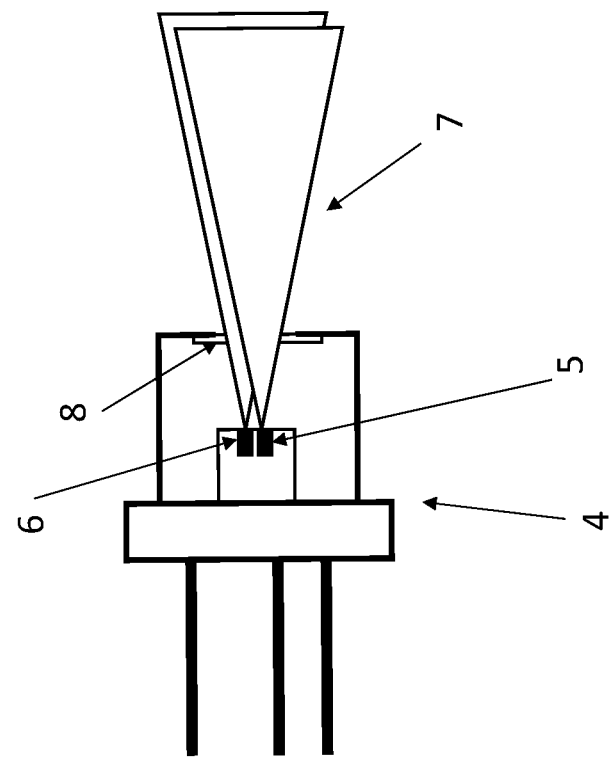

Specific examples of the disclosure will now be described with reference to the accompanying drawings. This disclosure may, however, be embodied in many different forms and should not be construed as limited to the examples set forth herein; rather, these examples are provided so that this disclosure will be thorough and complete, and will fully convey the scope of the disclosure to those skilled in the art.

The following disclosure focuses on examples of the present disclosure applicable to determining multiple gas concentrations using a compact optical sensor for measuring multiple gas concentrations using multiple lasers sources with overlapped laser beams. An advantage may be to use the compact optical sensor for measuring closed containers, such as, the integrity of containers, such as leak tests, such as non-destructive leak tests. A container may be a closed bag or closed tray that includes at least one species of a gas, such as at least two species of gas. Examples may be containers having a modified atmosphere (MAP). Modified atmosphere is commonly used in packages in order to improve the shelf life, for example in food packages, drugs, etc. gases commonly used are carbon dioxide (CO2) or nitrogen (N2) to lower the amount of oxygen (O2). This is made in order to slow down growth of aerobic organisms and prevent oxidation reactions. Hence it is important to monitor these packages and make sure that there is no leakage, for example during packaging, and/or to monitor that the gas composition in the headspace is correct. Apart from carbon dioxide (CO2) and oxygen (O2), other gases can be monitored as well, depending on the container and the product, for example may water vapour be of interest for certain products. The apparatus may also be used to monitor pressurised containers. An example may be spray cans where leakage of the propellant may be of interest to determine. Other characteristic of a container or its content which are dependent on properties of the gases may also be measured using the disclosed apparatus.

The sensor may also be used in the medical field for detecting gases or measuring gas concentrations in human cavities surrounded by tissue.

However, it will be appreciated for the person skilled in the art that the description is not limited to these applications but may be applied to many other systems where the concentration of multiple gases may need to be measured.

The Beer-Lambert law states that the gas absorption, which is the primarily measured quantity in a TDLAS measurement, is the product of the path length and the concentration. Therefore, the path length need to be defined in order to calculate the correct gas concentration. One possibility to obtain the path length in situations when this is not trivial to measure, is to use normalization using a reference gas with known concentration. Through the absorption, the path length for that gas can be retrieved, and by assuming the light probing the two gases have the same path length, the concentration of the primary gas is obtained. The reference gas may be of natural origin (like water vapor which has a known concentration if the relative humidity and temperature are known), or it may be intentionally added.

During recent years, "multi-layered"/"multi-band"/ "multi-sandwiched" photodiodes have emerged, which opens for the possibility to enable measurements over a wider range of wavelengths, using a single detector unit. These detectors are made using multiple (generally two) layers of light absorbing photo diode materials, for example Si and InGaAs. The layers are arranged after each other along an optical axis, such as on top of each other, so that the both layers are facing the receiving light, and their light collecting optical axes are perfectly overlapped. The top layer absorbs part of the light spectrum, while transmitting part which is absorbed by the other layer(s). In this way, a much broader absorption spectrum than generally possible with semiconductor-based detectors, is enabled. In this way it is possible to design a very compact detection scheme, where all light is collected with the same field-of-view, without additional optics. The electrical output signals from the different detector layers may also be registered individually. This feature enables that the different lasers may be operating simultaneously, and illuminating the same detector area, while their signals may still be registered individually. The different detector layers may be combined into a composite material, without separation. If Si and InGaAs are combined there are advantages of placing Si on top since the light that the InGaAs material absorbs is better transmitted through Si, than the other way around.

In some examples of the present disclosure, at least two very close lying laser sources, for providing a multi wavelength module, are combined with a multi-layered detector. The laser sources may, for example, be made by at least two individual laser diodes, which are positioned very closely within the same laser housing, such as in the same laser "can". The laser can, may, for example, be of type "TO-can", for example TO-18, TO-3, TO-38, TO-46, TO-5, TO-510, TO-66 or other standard laser diode cans, such as Ø5.6 mm or Ø9 mm cans. The laser sources may also be placed on other electronic devices, such a chip, without any can. The multiple laser sources may, for example, be monolithically integrated on the same substrate, which can allow for an emission point spacing of less than 100 um, or they may be placed on separated substrates. The different laser diodes may be using common or separated laser diode cathodes/anodes; the laser diodes may be using the same or different heat sinks, may be operated at the same or different temperatures. The laser diodes may, for example, be of type DFB or VCSEL.

Alternatively, the different laser sources (semiconductor materials) may even be placed behind each other (along the emission optical axis) to enable emission with exactly overlapping optical emission axes.

Such a system enables simultaneous measurements of multiple gas concentrations in the same gas volume. It also solves the problem to obtain overlapping beams without the need for extra optics, making a particularly compact and sensitive sensor.

When the emission points from the multiple laser sources are very close, the multiple laser sources can be collimated using the same collimation lens, into collimated beams that are almost perfectly aligned and overlapped. Using a standard collimation lens, for example a plano-convex lens, the collimated beams from sources that are separated transverse to the optical axis of the beam will have slightly different beam angles. The angle will generally, approximately, be proportional to the ratio between the separation between the sources and the focal length of the lens. For example, with a source separation of 100 um, and a focal length of 5 mm, the angle between the collimated beams will be around 2 degrees, which in many cases (for example short distances) is enough to be considered as overlapped beams.

The very clean design without extra optics does not only enable a compact system, but also creates better gas measurement performance, since avoiding unnecessary optics is key for avoiding optical noise (due to optical interference).

Previously presented apparatus and methods for combining light from different laser sources into overlapping beams, for gas measurements, have involved additional optics, for example dichroic beam splitters, polarizing beam splitters, semi-transparent mirrors, optical fiber combiners/splitters, fiber bundles, etc. The enclosed method, with laser chips placed extremely close together (<500 um apart), or even overlapped (along the optical axis), can eliminate all above mentioned additional optics, which reduces complexity, reduces cost, but primarily reduces optical noise which may be the dominating noise source in, for example, a TDLAS system.

Further, use of a "multi-pass cell" made by a porous medium, like for example a porous ceramic, may be used to create a long path-length through a very small volume. This solution is particularly well suited with a multi-laser solution, as in the present disclosure. With the beams probing the different gases, through the use of the present disclosure, all being automatically overlapped, the method of normalization using a reference gas is easily enabled.

FIG. 1 is illustrating a schematic example of an optical sensor. The sensor includes a multi-wavelength detector 1. The multi-wavelength detector may have a detector comprising at least two layers, a first layer absorbing a first wavelength range 2, and a second layer absorbing a second wavelength range 3. The optical sensor may further include a multi-wavelength laser module, which in this example may be a multi-wavelength laser 4. In the illustrated example the Multi-wavelength laser 4 is made from two chips arranged in same can, a first laser chip 5 and a second laser chip 6. The Multi-wavelength laser 4 emits uncollimated laser beams 7. This arrangement allows the laser sources to be positioned very close together enabling overlapped beam paths without additional optics while at the same time the multi-wavelength detector 1 enables measurements over a wider range of wavelengths, using a single detector unit, that has been transmitted the same beam path having the same path length. The Multi-wavelength laser 4 may further have a protective window 8 through which the uncollimated laser beams 7 are emitted.

Additionally, in some examples may the sensor be connected to a control unit for analysing light detected by the detector for retrieving concentrations of the multiple gases. The control unit may be a computer, a microprocessor or an electronic circuit that could run code or a software configured for analysing the light detected by the detector.

The optical probe may be arranged as a fiber probe, wherein emitted light from the multi-wavelength laser module is directed to a target site by a fiber probe. In some examples, the wavelengths emitted from multi-wavelength lasers are combined in the fiber member, such as a fiber probe, thereby providing a multi-wavelength laser module. In some examples, the multi-wavelength laser module of the described apparatus may comprise at least two laser sources configured for emitting different laser wavelengths. The different laser wavelengths may be combined in a fiber member, such as a single fiber, connected to the at least two laser sources. In this configuration, there is no need to connect each individual source to a separate fibre which is then combined or connected to a single fiber. Instead, due to the arrangement of the at least two laser sources, a single fiber can be directly coupled to the housing or can for receiving and transmitting the un-collimated emitted light from the laser sources to the target site.

In other example, the multi-wavelength laser module may comprise at least two laser sources configured to emitting different laser wavelengths. Each of the at least two laser sources may be connected to a fiber member and the fiber members are combined into a fiber bundle. The fibers in the fiber bundle are arranged very close together, enabling overlapped beam paths when the light is emitted from the fiber bundle. It should be noted that in the examples described above, it is not necessary to measure the gas concentration in absolute values. In some examples it is sufficient to measure a signal that is related to the gas concentration. In some examples, the spectroscopic signal is related to the gas pressure.

In some examples, at least one reference container is used, the reference container having no leaks, or having leaks with known characteristics. The measurement on the reference container provides a baseline signal which is used for comparison with the measured signals on subsequent containers.

Figure 2:
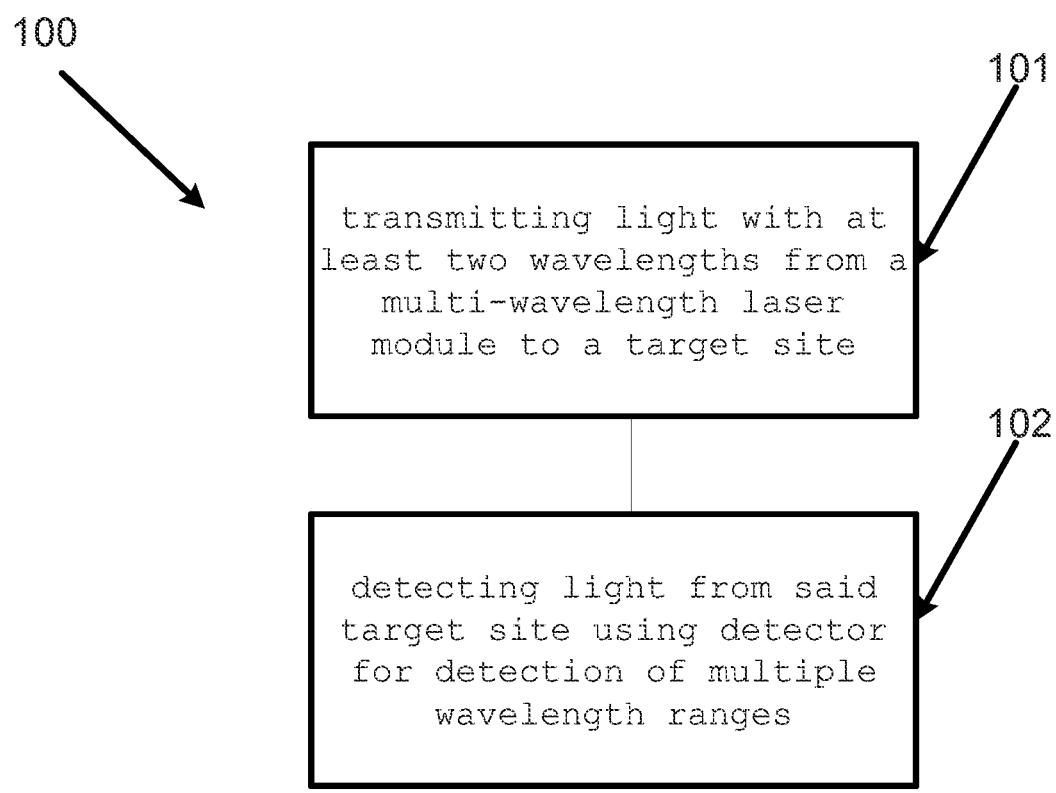
FIG. 2 is illustrating a flow-chart over a method of detecting multiple gases.

FIG. 2 is illustrating a flow-chart 100 over a method of detecting multiple gases. The method comprising transmitting 101 light with at least two wavelengths from a multi-wavelength laser module to a target site. The method further includes detecting 102 light from the target site using a multi-layered/multi-band detector, such as a detector for detection of multiple wavelength ranges, wherein the detector comprises at least two material layers arranged after each other along the same optical axis. Each layer is designed to detect a certain wavelength range.

The method may further include that the at least two wavelengths are transmitted simultaneously. Additionally and/or alternatively, in some examples may the method include that the two laser module includes two layer sources arranged so that the at least two wavelengths are transmitted with overlapping beam paths.

Additionally, in one example of the method may the target site be a container comprising at least one gas. The detected light may either transmitted through the container, or may be reflected from either a surface inside the container or outside the container so that the transmitted light passes through the container at least twice.

The present invention has been described above with reference to specific examples. However, other examples than the above described are equally possible within the scope of the disclosure. Different method steps than those described above, performing the method by hardware or software, may be provided within the scope of the invention. The different features and steps of the invention may be combined in other combinations than those described. The scope of the disclosure is only limited by the appended patent claims.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

The invention claimed is:

1. An apparatus for detecting multiple gases, said apparatus comprising:
 a multi-wavelength laser source comprising at least two tunable laser sources arranged in the same can, wherein the can comprises a window and the multi-wavelength laser source is configured to emit uncollimated light through the window, and
 a detector for detection of multiple wavelength ranges, the detector comprising at least two material layers arranged after each other along the same optical axis, where each layer is designed to detect a certain wavelength range different from each other,
 wherein the apparatus is configured for at least one of: a gas concentration measurement in a headspace of closed containers for food or pharmaceuticals, a gas pressure measurement in a headspace of closed containers for food or pharmaceuticals, and a leakage from a closed container for food or pharmaceuticals.

2. The apparatus of claim 1, wherein said multi-wavelength laser source is configured for emitting different laser wavelengths from at least two laser sources and that said at least two laser sources are positioned very close together enabling overlapped beam paths.

3. The apparatus of claim 2, wherein said multiple laser sources are made of different laser chips.

4. The apparatus of claim 1, wherein said multi-wavelength laser source comprises at least two laser sources configured for emitting different laser wavelengths, and wherein said different laser wavelengths are combined in a fiber member connected to said at least two laser sources.

5. The apparatus of claim 1, wherein said multi-wavelength laser source uses collimating optics for enabling overlapping beam paths.

6. The apparatus of claim 1, wherein said detection of multiple gases is based on tunable diode laser absorption spectroscopy.

7. The apparatus of claim 1, wherein said multi-wavelength laser source, and said detector for detection of multiple wavelength ranges are configured for measuring multiple gases simultaneously.

8. The apparatus of claim 1, where a porous medium is used as a multi-pass cell.

9. The apparatus of claim 1, wherein the light from said multi-wavelength laser source is directed to a target site by a fiber probe.

10. The apparatus of claim 1, where said multi-wavelength laser source is made by placing at least two laser medium emission sources behind each other in a semiconductor structure so that the optical axes of the emissions have completely overlapping optical axes.

11. The apparatus of claim 1, further comprising a one or more hardware processors configured to analyze detected light by said detector to retrieve at least one of: the concentration of said multiple gases or pressure in said head space of said multiple gases.

12. A method of employing the apparatus of claim 1 for allowing for a concentration of a first gas being retrieved by normalization to a second gas.

13. The apparatus of claim 1, wherein the multi-wavelength laser source comprises at least two laser sources configured to emit different laser wavelengths or a multi-wavelength laser configured to emit different laser wavelengths.

14. A method of detecting multiple gases for at least one of: a gas concentration measurement in a headspace of closed containers for food or pharmaceuticals, a gas pressure measurement in a headspace of closed containers for food or pharmaceuticals, and a leakage from a closed container for food or pharmaceuticals, said method comprising:
 transmitting light with at least two wavelengths from a multi-wavelength laser module to a target site, wherein said multi-wavelength laser module comprises at least two tunable laser sources arranged in the same can, each laser source being a chip and wherein the chips are arranged side-by-side in the same can to provide overlapped beam paths without additional optics;
 detecting light from said target site using detector for detection of multiple wavelength ranges, wherein said detector comprises at least two material layers arranged after each other along the same optical axis, where each layer is designed to detect a certain wavelength range different from each other.

15. The method of claim 14, wherein said at least two wavelengths are transmitted simultaneously.

16. The method of claim 14, wherein said at least two wavelengths are transmitted with overlapping beam paths.

17. The method of claim 14, wherein said target site is a container comprising at least one gas and said detected light is either transmitted through said container, or is reflected from either a surface in said container or outside said container so that said transmitted light passes through said container at least twice.

18. An apparatus for detecting multiple gases, said apparatus comprising:
 a multi-wavelength laser source comprising at least two tunable laser sources each laser source being a chip and wherein the chips are arranged side-by-side in the same can to provide overlapped beam paths without additional optics, and
 a detector for detection of multiple wavelength ranges, the detector comprising at least two material layers arranged after each other along the same optical axis, where each layer is designed to detect a certain wavelength range different from each other;

wherein the apparatus is configured for at least one of: a gas concentration measurement in a headspace of closed containers for food or pharmaceuticals, a gas pressure measurements in a headspace of closed containers for food or pharmaceuticals, and a leakage from a closed containers for food or pharmaceuticals.

19. The apparatus of claim 18, wherein the at least two tunable laser sources arranged in the same can are spaced apart at a distance of no more than 500 microns.

20. The apparatus according to claim 18, wherein said chips are monolithically integrated on a single substrate.

* * * * *